(12) United States Patent
Limonova et al.

(10) Patent No.: US 11,995,152 B2
(45) Date of Patent: May 28, 2024

(54) BIPOLAR MORPHOLOGICAL NEURAL NETWORKS

(71) Applicant: Smart Engines Service, LLC, Moscow (RU)

(72) Inventors: Elena Evgenyevna Limonova, Moscow (RU); Dmitry Petrovich Nikolaev, Moscow (RU); Vladimir Viktorovich Arlazarov, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 406 days.

(21) Appl. No.: 17/495,628

(22) Filed: Oct. 6, 2021

(65) Prior Publication Data

US 2022/0292312 A1     Sep. 15, 2022

(30) Foreign Application Priority Data

Mar. 15, 2021     (RU) ................................ 2021106621

(51) Int. Cl.
| | | |
|---|---|---|
| *G06F 18/214* | (2023.01) | |
| *G06F 18/2431* | (2023.01) | |
| *G06N 3/04* | (2023.01) | |
| *G06N 3/08* | (2023.01) | |
| *G06V 20/00* | (2022.01) | |
| *G06V 20/62* | (2022.01) | |

(52) U.S. Cl.
CPC ...... *G06F 18/2148* (2023.01); *G06F 18/2431* (2023.01); *G06N 3/04* (2013.01); *G06N 3/08* (2013.01); *G06V 20/00* (2022.01); *G06V 20/62* (2022.01)

(58) Field of Classification Search
CPC ... G06F 18/2148; G06F 18/2431; G06N 3/04; G06N 3/0455; G06N 3/0464; G06N 3/048; G06N 3/08; G06N 3/082; G06N 3/09; G06V 10/774; G06V 10/778; G06V 10/82; G06V 20/00; G06V 20/62
See application file for complete search history.

(56) References Cited

U.S. PATENT DOCUMENTS

2022/0215553 A1*   7/2022   Oakley ............... A61B 5/4824

OTHER PUBLICATIONS

Skoryukina et al., "Real Time Rectangular Document Detection on Mobile Devices," Proc. of SPIE vol. 9445 94452A-1, Feb. 2015, 6 pages.
Bulatov et al., "Smart IDReader: Document Recognition in Video Stream," 2017 14th IAPR International Conference on Document Analysis and Recognition, Nov. 2017, IEEE, pp. 39-44.
Abramov et al., "Intelligent telemetry data analysis for diagnosing of the spacecraft hardware," Informatsionnye Tekhnologii i Vychslitel'nye Sistemy, 2016, No. 1, 64-75.

(Continued)

*Primary Examiner* — Zhiyu Lu
(74) *Attorney, Agent, or Firm* — Procopio, Cory, Hargreaves & Savitch LLP

(57) ABSTRACT

A bipolar morphological neural network may be generated by converting an initial neural network by replacing multiplication calculations in one or more convolutional layers with approximations that utilize maximum/minimum and/or addition/subtraction operations. The remaining part of the network may be trained after each convolutional layer is converted.

17 Claims, 7 Drawing Sheets

FIG. 3

(56) References Cited

OTHER PUBLICATIONS

Avsentiev et al., "Sequential Application of the Hierarchy Analysis Method and Associative Training of a Neural Network in Examination Problems," DOI: 10.14529/mmp170312, Bulletin of the South Ural State University. Ser. Mathematical Modelling, Programming & Computer Software (Bulletin SUSU MMCS) vol. 10, No. 3, Aug. 2017, pp. 142-147.
Sheshkus et al., "Approach to Recognition of Flexible Form for Credit Card Expiration Date Recognition as Example," Proc. of SPIE vol. 9875 98750R-1, 2015, 5 pages.
Gupta et al., "Deep Learning with Limited Numerical Precision," arXiv:1502.02551v1 [cs.LG] Feb. 9, 2015, 10 pages.
Denton et al., "Exploiting Linear Structure Within Convolutional Networks for Efficient Evaluation," arXiv:1404.0736v2 [cs.CV] Jun. 9, 2014, 11 pages.
Ilin et al., "Fast Integer Approximations In Convolutional Neural Networks Using Layer-By-Layer Training," Proc. of SPIE vol. 10341 103410Q-1, 2017, 5 pages.
Limonova et al., "Convolutional Neural Network Structure Transformations for Complexity Reduction and Speed Improvement," ISSN 1054-6618, Pattern Recognition and Image Analysis, 2018, vol. 28, No. 1, pp. 24-33.
Vanhoucke et al., "Improving the speed of neural networks on CPUs," Deep Learning and Unsupervised Feature Learning Workshop, 2011, 8 pages.
Ritter et al., "An Introduction to Morphological Neural Networks," Proceedings of 13th International Conference on Pattern Recognition, IEEE, Aug. 6, 2002, 9 pages.
Patterson et al., "Computer Organization and Design The Hardware/Software Interface," Revised Fourth Edition, Elsevier Science, Oct. 13, 2011, 919 pages.
Zhou et al., "Dorefa-Net: Training Low Bitwidth Convolutional Neural Networks With Low Bitwidth Gradients," arXiv:1606.06160v2 [cs.NE] Jul. 17, 2016, 14 pages.
Courbariaux et al., "Binarized Neural Networks: Training Neural Networks with Weights and Activations Constrained to +1 or −1," arXiv:1602.02830v3 [cs.LG] Mar. 17, 2016, 11 pages.
Rastegari et al., "XNOR-Net: ImageNet Classification Using Binary Convolutional Neural Networks," arXiv:1603.05279v4 [cs.CV] Aug. 2, 2016, 17 pages.
Zhou et al., "Incremental Network Quantization: Towards Lossless CNNS With Low-Precision Weights," arXiv:1702.03044v2 [cs.CV] Aug. 25, 2017, 14 pages.
Choukroun et al., "Low-bit Quantization of Neural Networks for Efficient Inference," arXiv:1902.06822v2 [cs.LG] Mar. 25, 2019, 10 pages.
Sussner et al., "Constructive Morphological Neural Networks: Some Theoretical Aspects and Experimental Results in Classification," Constructive Neural Networks. Studies in Computational Intelligence, vol. 258, 2009, pp. 123-144.
Ritter et al., "Morphological Perceptrons with Dendritic Structure," The IEEE International Conference on Fuzzy Systems, 2003, pp. 1296-1301.
Ritter et al., "Lattice Algebra Approach to Single-Neuron Computation," IEEE Transactions on Neural Networks, vol. 14, No. 2, Mar. 2003, pp. 282-295.
Sossa et al., "Efficient training for dendrite morphological neural networks," Neurocomputing 131 (2014) 132-142.
Erik Zamora, Humberto Sossa, Dendrite Morphological Neurons Trained by Stochastic Gradient Descent, Neurocomputing (2017), doi: 10.1016/j.neucom.2017.04.044, 30 pages.
Mondal et al., "Dense Morphological Network: An Universal Function Approximator," arXiv:1901.00109v1 [cs.LG] Jan. 1, 2019, 14 pages.
LeCun et al., "The MNIST Database of handwritten digits," MNIST handwritten digit database, Yann LeCun, Corinna Cortes and Chris Burges, yann.lecun.com/exdb/mnist/, Mar. 31, 2021, 7 pages.
Wikipedia, "Machine-readable passport," https://en.wikipedia.org/wiki/Machine-readable_passport, Mar. 31, 2021, 7 pages.
Chang et al., "A Vision-based Human Action Recognition System for Moving Cameras Through Deep Learning," SPML 19: Proceedings of the 2019 2nd International Conference on Signal Processing and Machine Learning, Nov. 2019 pp. 85-91.
Zhang et al., "Deeper and Wider Siamese Networks for Real-Time Visual Tracking," arXiv:1901.01660v3 [cs.CV] Mar. 28, 2019, 10 pages.
Li et al., "Page Object Detection from PDF Document Images by Deep Structured Prediction and Supervised Clustering," 2018 24th International Conference on Pattern Recognition (ICPR) Beijing, China, Aug. 20-24, 2018 IEEE, pp. 3627-3632.
Bokovoy, "Automatic control system's architecture for group of small unmanned aerial vehicles," Informatsionnye Tekhnologii i Vychslitel'nye Sistemy, 2018, No. 1, 68-77.
Puybareau et al., "Real-Time Document Detection in Smartphone Videos," 2018 IEEE, pp. 1498-1502.
Chernyshova et al., "Two-Step CNN Framework for Text Line Recognition in Camera-Captured Images," IEEE vol. 8, 2020, 14 pages.
Strubell et al., "Energy and Policy Considerations for Deep Learning in NLP," arXiv:1906.02243v1 [cs.CL] Jun. 5, 2019, 6 pages.
Schwartz et al., "Green AI," arXiv:1907.10597v3 [cs.CY] Aug. 13, 2019, 12 pages.
Yao et al., "Efficient Implementation of Convolutional Neural Networks With End to End Integer-Only Dataflow," 2019 IEEE International Conference on Multimedia and Expo (ICME), pp. 1780-1785.
Al-Hami et al., "Methodologies of Compressing a Stable Performance Convolutional Neural Networks in Image Classification," Neural Processing Letters, Jul. 20, 2019, 23 pages.
Sun et al., "Multi-Precision Quantized Neural Networks via Encoding Decomposition of $\{-1, +1\}$", arXiv:1905.13389v1 [cs.CV] May 31, 2019, 10 pages.
Limonova et al., "Special Aspects of Matrix Operation Implementations for Low-Precision Neural Network Model on the Elbrus Platform," Bulletin of the South Ural StateUniversity. Ser. Mathematical Modelling, Programming & ComputerSoftware (Bulletin SUSU MMCS), 2020, vol. 13, No. 1, pp. 118-128.
Morcel et al., "FeatherNet: An Accelerated Convolutional Neural Network Design for Resource-constrained FPGAs," ACM Transactions on Reconfigurable Technology and Systems, vol. 12, No. 2, Article 6. Pub. date: Mar. 2019, 27 pages.
Li et al., "Simulate-the-hardware: Training Accurate Binarized Neural Networks for Low-Precision Neural Accelerators," ASPDAC '19, Jan. 21-24, 2019, Tokyo, Japan, 6 pages.
Gerardo Hernandez, Erik Zamora, Humberto Sossa, German Tellez, Federico Furlan, Hybrid neural networks for big data classification, Neurocomputing (2019), https://doi.org/10.1016/j.neucom.2019.08.095, 36 pages.
Mellouli et al., "Morphological Convolutional Neural Network Architecture for Digit Recognition," IEEE Transactions on Neural Networks and Learning Systems, 2019, 10 pages.
Elhoushi et al., "DeepShift: Towards Multiplication-Less Neural Networks," arXiv:1905.13298v2 [cs.LG] Jun. 6, 2019, 11 pages.
Chen et al., "AdderNet: DoWe Really Need Multiplications in Deep Learning?," arXiv:1912.13200v1 [cs.CV] Dec. 31, 2019, 10 pages.
Limonova et al., "Bipolar Morphological Neural Networks: Convolution Without Multiplication," Computer Science, Neural and Evolutionary Computing, arXiv:1911.01971, Nov. 5, 2019, 8 pages.
Pratikakis et al., "ICDAR 2019 Competition on Document Image Binarization (DIBCO 2019)," 2019 International Conference on Document Analysis and Recognition (ICDAR), IEEE, 2019, pp. 1547-1556.
Ronneberger et al., "U-Net: Convolutional Networks for Biomedical Image Segmentation," arXiv:1505.04597v1 [cs.CV] May 18, 2015, 8 pages.
Baheti et al., "Eff-unet: A novel architecture for semantic segmentation in unstructured environment," Proceedings of the IEEE/CVF Conference on Computer Vision and Pattern Recognition Workshops, 2020, 9 pages.

(56) References Cited

OTHER PUBLICATIONS

Piantadosi et al., "Breast Segmentation in MRI via U-Net Deep Convolutional Neural Networks," 2018 24th International Conference on Pattern Recognition (ICPR) Beijing, China, Aug. 20-24, 2018, pp. 3917-3922.
Ibtehaz et al., "MultiResUNet : Rethinking the U-Net architecture for multimodal biomedical image segmentation," Neural Networks 121 (2020), pp. 74-87.
Limonova et al., "ResNet-like Architecture with Low Hardware Requirements," arXiv:2009.07190v1 [cs.CV] Sep. 15, 2020, 8 pages.
Bezmaternykh et al., "U-Net-bin: hacking the document image binarization contest," Computer Optics 2019, 43(5), pp. 825-832.
Lu et al., "Distance-Reciprocal Distortion Measure for Binary Document Images," IEEE Signal Processing Letters, vol. 11, No. 2, Feb. 2004, pp. 228-231.
Limonova et al., "Bipolar Morphological U-Net for Document Binarization," Proc. of SPIE vol. 11605, 116050P, 2021, 10 pages.

\* cited by examiner

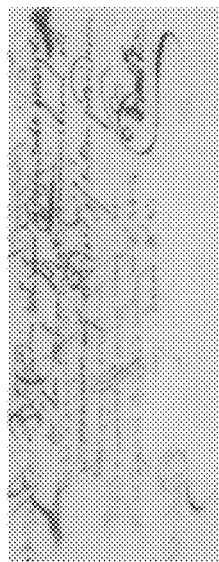
FIG. 8A
FIG. 8B

BIPOLAR MORPHOLOGICAL NEURAL NETWORKS

CROSS-REFERENCE TO RELATED APPLICATIONS

This application claims priority to Russian Patent App. No. 2021106621, filed on Mar. 15, 2021, which is hereby incorporated herein by reference as if set forth in full.

BACKGROUND

Field of the Invention

The embodiments described herein are generally directed to neural networks, and, more particularly, to bipolar morphological neural networks that minimize, eliminate, or otherwise reduce multiplication operations.

Description of the Related Art

Neural networks are widely used in computer recognition and vision, and the scope of neural network usage continues to grow steadily. Various deep neural network architectures have been developed to solve problems of interest. Currently, neural networks are actively used on mobile devices and embedded systems that have limited resources (e.g., processing, memory, and/or electrical power resources) and a strong need for low power consumption (e.g., because they depend upon battery power). There are a number of methods for reducing resource consumption of neural networks on such devices, but these methods have constraints that limit their applicability.

SUMMARY

Accordingly, systems, methods, and non-transitory computer-readable media are disclosed for bipolar morphological neural networks.

In an embodiment, a method is disclosed that uses at least one hardware processor to: convert an initial neural network into a bipolar morphological neural network by, for one or more convolutional layers in the initial neural network, converting the convolutional layer into a bipolar morphological layer by replacing each calculation of $$\sum_{i=1}^{N} x_i w_i$$

wherein x is an input in an input vector that has a length N, and w is a weight, with a calculation of $$\exp \max_j (y_j + v_j)$$

wherein exp is an exponential function, max identifies a maximum, y is a new input derived from x, and v is a new weight derived from w; and train each bipolar morphological layer in the bipolar morphological neural network layer by layer.

A structure of the bipolar morphological layer may be:

$$\exp \max_j (\ln ReLU(x_j) + v_j^0) - \exp \max_j (\ln ReLU(x_j) + v_j^1) - $$
$$\exp \max_j (\ln ReLU(-x_j) + v_j^0) + \exp \max_j (\ln ReLU(-x_j) + v_j^1)$$

wherein $$v_j^k = \begin{cases} \ln|w_j|, & \text{if } (-1)^k w_j > 0 \\ -\infty, & \text{otherwise} \end{cases}$$

wherein ln is a natural logarithm, and ReLU is a Rectified Linear Unit.

Each bipolar morphological layer may process positive and negative parts of x separately but in a same manner. A structure of the bipolar morphological layer may be:

$$\sigma\big(\exp \max_{j=1}^{N}(\ln x_j^+ + v_j^+) - \exp \max_{j=1}^{N}(\ln x_j^+ + v_j^-) - $$
$$\exp \max_{j=1}^{N}(\ln x_j^- + v_j^+) + \exp \max_{j=1}^{N}(\ln x_j^- + v_j^-) + v_b\big)$$

wherein $$x_j^+ = \begin{cases} x_j, & x_j \geq 0 \\ 0, & x_j < 0 \end{cases}$$

$$x_j^- = \begin{cases} -x_j, & x_j < 0 \\ 0, & x_j \geq \end{cases}$$

$$v_j^k = \begin{cases} \ln|w_j|, & \text{if } (-1)^k w_j > 0 \\ -\infty, & \text{otherwise} \end{cases}$$

wherein ln is a natural logarithm.

Training the bipolar morphological neural network may comprise, sequentially from first to last, for each bipolar morphological layer: training the bipolar morphological layer; and, after training the bipolar morphological layer and before any subsequent training, freezing a structure and weights of the bipolar morphological layer, such that the structure and weights of the bipolar morphological layer do not change during the subsequent training.

The initial neural network may have a U-Net architecture.

The method may further comprise using the at least one hardware processor to execute the trained bipolar morphological neural network to complete a task that produces an output from an input. The input image may comprise an image, wherein the task comprises object recognition within the image. The input may comprise an image, wherein the task comprises text recognition within the image. The input may comprise an image, wherein the task comprises classifying each pixel in the image into one of two classes, and wherein the output comprises a binarization of the image. The initial neural network may have a U-Net architecture. The two classes may consist of foreground and background. The method may further comprise using the at least one hardware processor to generate the input by: converting an input image to grayscale; and extracting a plurality of patches from the grayscale input image, wherein each of the plurality of patches is an input to the trained bipolar morphological neural network.

The method may further comprise using the at least one hardware processor to, before converting the initial neural network into the bipolar morphological neural network, train the initial neural network.

The method may further comprise using the at least one hardware processor to, after training each bipolar morphological layer in the bipolar morphological neural network layer by layer, training a remainder of the bipolar morphological neural network without changing a structure and weights of any bipolar morphological layers in the bipolar morphological neural network.

Converting an initial neural network into a bipolar morphological neural network may further comprise, for one or more fully-connected layers in the initial neural network, converting the fully-connected layer into a bipolar morphological layer by replacing an operation of $$J = \sigma\left(\sum_{p=1}^{P} I(p) \cdot w(p, q) + b(q)\right)$$

wherein q=$\overline{1,Q}$, wherein I is an input to the fully-connected layer, J is an output from the fully-connected layer, σ is a nonlinear activation function, P is a number of inputs I, Q is a number of neurons in the fully-connected layer, w(p,q) is a weight for input p and neuron q, and b(q) is a bias for neuron q, with an operation of $$J = \sigma\bigl(\exp\max_{p=1}^{P}(\ln|I(p)| + v^+(p, q)) - \exp\max_{p=1}^{P}(\ln|-I(p)| + v^+(p, q)) - \\ \exp\max_{p=1}^{P}(\ln|I(p)| + v^-(p, q)) + \exp\max_{p=1}^{P}(\ln|-I(p)| + v^-(p, q)) + b(q)\bigr)$$

wherein $v^+(p,q)$ is a new weight for a positive part of input p and neuron q, and wherein $v^-(p,q)$ is a new weight for a negative part of input p and neuron q.

All convolutional layers in the initial neural network may be converted into bipolar morphological layers. The convolutional layers in the initial neural network may be the only layers in the initial neural network that are converted into bipolar morphological layers.

Any of the methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 8A and 8B illustrate examples of an input and outputs of document binarization.

DETAILED DESCRIPTION

In an embodiment, systems, methods, and non-transitory computer-readable media are disclosed for generating and operating a bipolar morphological neural network. After reading this description, it will become apparent to one skilled in the art how to implement the invention in various alternative embodiments and for alternative uses. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. EXAMPLE PROCESSING DEVICE

Figure 1:
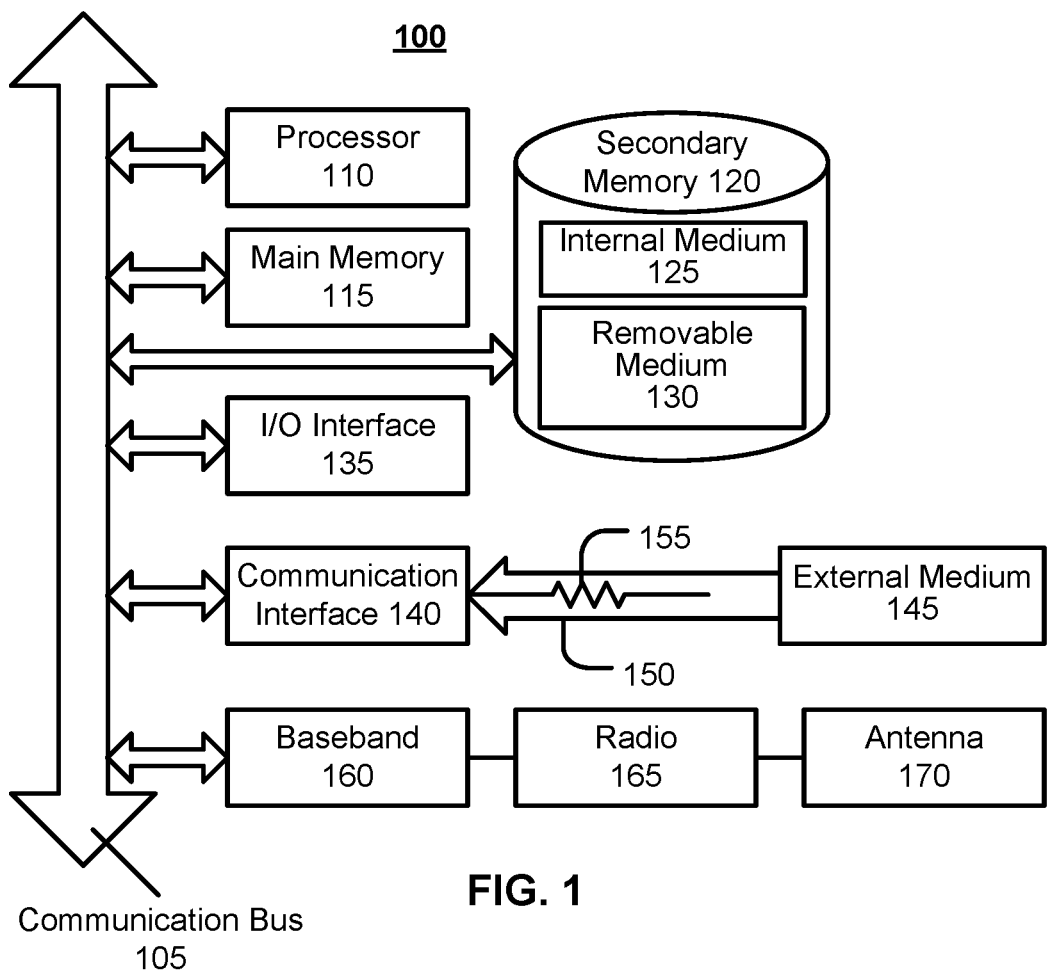
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used to execute one or more of the functions, processes, or methods described herein (e.g., one or more software modules of an application implementing the disclosed processes). System 100 can be a server (e.g., which services requests over one or more networks, including, for example, the Internet), a personal computer (e.g., desktop, laptop, or tablet computer), a mobile device (e.g., smartphone), a controller (e.g., in an autonomous vehicle, robot, etc.), or any other processor-enabled device that is capable of wired or wireless data communication. Other computer systems and/or architectures may be also used, as will be clear to those skilled in the art.

System 100 preferably includes one or more processors, such as processor 110. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, California.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 100 preferably includes a main memory 115 and may also include a secondary memory 120. Main memory 115 provides storage of instructions and data for programs executing on processor 110, such as one or more of the functions, processes, and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., one or more software modules implementing the disclosed processes) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or executable code may be transferred to system 100 from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as one or more software modules implementing the disclosed processes) is stored in main memory 115 and/or secondary memory 120. Computer programs can also be received via communication interface 140 and stored in main memory 115 and/or secondary memory 120. Such computer programs, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and/or external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device, in the console of a vehicle, etc.).

In an embodiment, I/O interface 135 provides an interface to a camera (not shown). for example, system 100 may be a mobile device, such as a smartphone, tablet computer, or laptop computer, with one or more integrated cameras (e.g., rear and front facing cameras). Alternatively, system 100 may be a desktop or other computing device that is connected via I/O interface 135 to an external camera. In either case, the camera captures images (e.g., photographs, video, etc.) for processing by processor(s) 110 (e.g., executing the disclosed software) and/or storage in main memory 115 and/or secondary memory 120.

System 100 may also include optional wireless communication components that facilitate wireless communication over a voice network and/or a data network. The wireless communication components comprise an antenna system 170, a radio system 165, and a baseband system 160. In such an embodiment, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 may decode the signal and convert it to an analog signal. Then, the signal is amplified and sent to a speaker. Baseband system 160 may also receive analog audio signals from a microphone. These analog audio signals may be converted to digital signals and encoded by baseband system 160. Baseband system 160 can also encode the digital signals for transmission and generate a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 may also be communicatively coupled with processor 110, which may be a central processing unit (CPU). Processor 110 has access to data storage areas 115 and 120. Processor 110 is preferably configured to execute instructions (i.e., computer programs, such one or more software modules implementing the disclosed processes) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. PROCESS OVERVIEW

Embodiments of processes for generating and operating a bipolar morphological neural network will now be described. It should be understood that the described processes may be embodied as an algorithm in one or more software modules, forming an application that is executed by one or more hardware processors processor 110, for example, as a software application or library. The described processes may be implemented as instructions represented in source code, object code, and/or machine code. These instructions may be executed directly by the hardware processor(s) 110, or alternatively, may be executed by a virtual machine operating between the object code and the hardware processor(s) 110. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

2.1. Introduction

Image processing and recognition have become an integral part of modern life. Recognition applications are used to address a wide range of practical problems that require accurate and fast operation. Such systems should satisfy the applicable Quality of Service (QoS) conditions (e.g., maximum decision delay), be scalable, and be energy-efficient. One key concept in such systems is edge computing, which refers to a paradigm in which all computations are performed on the device or on the nearest computing system. The most striking example of this is autonomous vehicles, which must analyze traffic conditions and make decisions in real time without any delays. Another example is computer vision, such as document detection and recognition, on smartphones. The problem of designing such systems is not trivial, since the system must be capable of performing a vast amount of operations on the device, while remaining resource-efficient. An additional field in which edge computing has a significant advantage is the Internet of Things (IoT). IoT devices are interconnected in one network (e.g., often a wireless network), and must use network bandwidth and energy extremely efficiently. This means that image processing devices should have very specialized and simple architectures, and be able to perform basic operations without requiring data to be transferred to and from a remote server.

Another reason to be aware of the energy and computational efficiency of recognition systems is the environmental impact of such systems. Training processes and neural architecture searches for complex networks lead to significant carbon dioxide emissions. The main idea of "green AI" is to reduce the environmental impact of the training, deployment, and infrastructure of new artificial intelligence methods. Thus, compact models for efficient on-device recognition are of vital interest.

One way to improve the efficiency of neural networks is to reduce their inference time, and one way to improve the inference time of neural networks is to use a computationally simplified neuron model. The calculations in such a neuron model can be implemented using fewer logic gates than the sequences of multiplications and additions used in classical neuron models. This means that calculations in a simplified neuron model can be performed in less time and are more energy efficient. The latter circumstance is especially important for mobile recognition systems, which may rely on batteries as their electrical power sources.

In image recognition, one method for creating small and fast models is to use quantization to low-precision integer weights and activations. For example, Yao et al., "Efficient implementation of convolutional neural networks with end to end integer-only dataflow," in 2019 IEEE Int'l Conference on Multimedia and Expo (ICME), 1780-1785 (July 2019), which is hereby incorporated herein by reference as if set forth in full, proposed an end-to-end 8-bit integer model without internal conversions to floating-point data types. Such models can provide fast inference on mobile and embedded devices with relatively small losses in accuracy. Various methods have been proposed for increasing the accuracy of quantized networks. See, e.g., Choukroun et al., "Low-bit quantization of neural networks for efficient inference," arXiv:1902.06822 (2019); Pietron et al., "Methodologies of compressing a stable performance convolutional neural networks in image classification," Neural Processing Letters, 1-23 (2019); Sun et al., "Multi-precision quantized neural networks via encoding decomposition of {−1,+1}," in Proceedings of the AAAI Conference on Artificial Intelligence, 33, 5024-5032 (2019); and Ilin et al., "Fast integer approximations in convolutional neural networks using layer-by-layer training," in 9th Int'l Conference on Machine Vision, 103410Q-103410Q, Int'l Society for Optics and Photonics (2017), DOI: 10.1117/12.2268722; which are all hereby incorporated herein by reference as if set forth in full. Fast implementations are also of interest. See, e.g., Limonova et al., "Special aspects of matrix operation implementations for low-precision neural network model on the Elbrus platform," Vestnik YuUrGU MMP 13(1), 118-128 (2020), doi:10.14529/mmp200109; Morcel et al., "Feather-Net: An accelerated convolutional neural network design for resource-constrained FPGAs," ACM Trans. Reconfigurable Technol. Syst. 12(2) (2019); and Li et al., "Simulate-the-hardware: Training accurate binarized neural networks for low-precision neural accelerators," in Proceedings of the 24th Asia and South Pacific Design Automation Conference, ASPDAC '19, 323-328 (2019); which are all hereby incorporated herein by reference as if set forth in full.

Examples of neural networks with simplified neuron models are those with integer calculations and morphological neural networks. See, e.g., Vanhoucke et al., "Improving the speed of neural networks on CPUs," in Deep Learning Unsupervised Feature Learning Workshop, NIPS 2011 (2011); Ritter et al., "An introduction to morphological neural networks," Proceedings of 13th Int'l Conference on Pattern Recognition 4, 709-717, vol. 4 (1996); which are both hereby incorporated herein by reference as if set forth in full. The usage of integer data types can speed up inference, because calculation of an integer sum and integer product on modern mobile central processors is faster than the calculation of a real sum and real product. This is due to architectural issues of the Advanced Reduced Instruction Set Computer (RISC) Machines (ARM) processor, which is a common processor used in mobile devices and embedded systems, as well as the presence of Single Instruction Multiple Data (SIMD) extensions. Such extensions can simultaneously perform the same operation on multiple elements of a data register. In the case of integer calculations, SIMD is very useful, since the register has a fixed size of, for example, 128 bits (for ARM NEON™ and Intel SSE™), which allows processing of four float32 values and sixteen 8-bit values. However, replacing the classical neuron model with an integer model implies a change in the calculation results, due to the accuracy loss of the weights and possible overflows. Recent research introduces different methods to preserve recognition quality, even with low-bit quantization of a network. See, e.g., Gupta et al., "Deep learning with limited numerical precision," in Proceedings of the 32nd Int'l Conference on Machine Learning (ICML-15), D. Blei and F. Bach, eds., 1737-1746, JMLR Workshop and Conference Proceedings (2015); Ilin et al.; Zhou et al., "Dorefa-net: Training low bitwidth convolutional neural networks with low bitwidth gradients," arXiv preprint arXiv: =1606.06160 (2016); Courbariaux et al., "Binarized neural networks: Training deep neural networks with weights and activations constrained to +1 or −1," arXiv preprint arXiv:1602.02830 (2016); Rastegari et al., "Xnor-net: ImageNet classification using binary convolutional neural networks," in European Conference on Computer Vision, 525-542, Springer (2016); Zhou et al., "Incremental network quantization: Towards lossless CNNs with low-precision weights," (2017), arXiv:1702.03044; and Choukroun et al.; which are all hereby incorporated herein by reference as if set forth in full.

In an embodiment, a morphological neuron model uses addition and maximum/minimum operations, instead of addition and multiplication operations, as well as threshold nonlinear activation functions. See, e.g., Ritter et al.; and Sussner et al., "Constructive Morphological Neural Networks: Some Theoretical Aspects and Experimental Results in Classification," 123-144, Springer Berlin Heidelberg (2009); which are both hereby incorporated herein by reference as if set forth in full. This model largely appeals to the biological properties of neurons. Further development of this idea is a dendrite morphological neuron, which enables simulation of the excitation and inhibition processes and a generalization of the model in terms of lattice algebra. See, e.g., Ritter et al., "Morphological perceptrons with dendritic structure," in the 12th IEEE Int'l Conference on Fuzzy Systems, 2003, 2, 1296-1301, vol. 2 (2003); and Ritter et al., "Lattice algebra approach to single-neuron computation," IEEE Transactions on Neural Networks 14, 282-295 (2003); which are both hereby incorporated herein by reference as if set forth in full.

Notably, a morphological neural network is usually a single-layer perceptron. To train such a neural network, heuristic algorithms are used, which can be supplemented by stochastic gradient descent. See, e.g., Sossa et al., "Efficient training for dendrite morphological neural networks," Neurocomputing 131, 132-142 (2014); and Zamora et al., "Dendrite morphological neurons trained by stochastic gradient descent," in 2016 IEEE Symposium Series on Computational Intelligence (SSCI), 1-8 (2016); which are both hereby incorporated herein by reference as if set forth in full. However, when used in deep models and trained with gradient descent methods, the neuron is inferior to the McCulloch-Pitts neuron for a number of problems. At the same time, this neuron shows promising results in hybrid models, in which morphological neurons are used to extract features. See, e.g., Hernandez et al., "Hybrid neural networks for big data classification," Neurocomputing 390, 327-340 (2020) which is hereby incorporated herein by reference as if set forth in full.

Another morphological neural network model, called DenMo-Net, with dilation and erosion neurons was presented in Mondal et al., "Dense morphological network: an universal function approximator," arXiv preprint arXiv: 1901.00109 (2019), which is hereby incorporated herein by reference as if set forth in full. Networks with the three-layer DenMo-Net architecture demonstrated good results, relative to a classical three-layer architecture. However, this model does not seem to be scalable, and does not show state-of-the art quality in image recognition problems with its simple structure.

There are also methods to modify layers to exclude multiplication operations. For example, Mellouli et al., "Morphological convolutional neural network architecture for digit recognition," IEEE Transactions on Neural Networks and Learning Systems 30(9), 2876-2885 (2019), which is hereby incorporated herein by reference as if set forth in full, introduced MConv layers that calculate erosion or dilation in a sliding window, similar to standard convolutional layers, and achieve state-of-the-art classification accuracy for Modified National Institute of Standards and Technology (MNIST) and Street View House Numbers (SVNH) datasets. In a DeepShift model, Elhoushi et al., "DeepShift: Towards multiplication-less neural networks," arXiv preprint arXiv:1905.13298 (2019), which is hereby incorporated herein by reference as if set forth in full, trained networks to have a bit shift, instead of multiplication. Chen et al., "AdderNet: Do we really need multiplications in deep learning?," in 12th Int'l Conference on Machine Vision (ICMV 2019), 11433, 962-969, Int'l Society for Optics and Photonics, SPIE (2020), doi:10.1117/12.2559299, which is hereby incorporated herein by reference as if set forth in full, modified convolutional layers to use the Li-norm. This enables the simplification of feature extraction in the network, while preserving multiplication operations in other layers. Such a network is trained using sign gradient in backpropagation.

2.2. BM Layer

In an embodiment, a new model of a neuron is utilized, based on the idea of a morphological neuron. The model may be considered an approximation of a classical neuron, which enables the adaptation of modern neural network architectures to this new neuron model. In addition, a new approach to training and fine-tuning such neural networks is disclosed. The new trained model was tested for MNIST number recognition, Machine-Readable Zone (MRZ) symbol recognition, and document binarization, as discussed elsewhere herein.

In an embodiment, neural network layers with neurons that calculate linear combinations of inputs are approximated by a morphological structure. These layers can be fully connected or convolutional, which is normally the most computationally complex part of a neural network. In an embodiment, the majority of computations utilize maximum/minimum and addition operations.

The morphological structure of each layer may be referred to herein as a "bipolar morphological layer" or "BM layer," and one neuron may be referred to herein as a "bipolar morphological neuron," "BM neuron," or "BMN." The word "bipolar" refers to the two computational paths that consider excitation and inhibition processes in a neuron. In biology, bipolar neurons are mostly responsible for perception, and can be found, for example, in the retina.

The structure of the BM layer is inspired by approximation of the classical layer. The calculations of one neuron can be expressed as four neurons placed in parallel with the following addition and subtraction:

$$\sum_{i=1}^{N} x_i w_i = \sum_{i=1}^{N} p_i^{00} x_i w_i - \sum_{i=1}^{N} p_i^{01} x_i |w_i| - \sum_{i=1}^{N} p_i^{10} |x_i| w_i + \sum_{i=1}^{N} p_i^{11} |x_i||w_i|$$

wherein $$p_i^{kj} = \begin{cases} 1, & \text{if } (-1)^k x_i > 0 \text{ and } (-1)^j w_i > 0 \\ 0, & \text{otherwise} \end{cases}$$

Values of $p_i^{kj}$ define the connections of new neurons. For each value, the inputs x and weights w are considered as positive values, and approximation is performed. Denote:

$$M = \max_j (x_j w_j)$$

$$k = \frac{\sum_{i=1}^{N} x_i w_i}{M} - 1$$

The approximation is:

$$\sum_{i=1}^{N} x_i w_i = \exp\left\{\ln \sum_{i=1}^{N} x_i w_i\right\} = \exp\{\ln M(1+k)\} =$$

$$(1+k)\exp \ln M = (1+k)\exp\left\{\ln\left(\max_j (x_j w_j)\right)\right\} = (1+k)\exp \max_j \ln(x_j w_j) =$$

$$(1+k)\exp \max_j (\ln x_j + \ln w_j) = (1+k)\exp \max_j (y_j + v_j) \approx \exp \max_j (y_j + v_j)$$

wherein $y_j$ are new inputs, and $v_j = \ln w_j$ are new weights. This approximation is correct when k<<1. Since 0≤k≤N−1, the best case is that the sum contains only one non-zero term (k=0), and the worst case is that the sum contains all equal terms (k=N−1). In the worst case, the real value for the sum will be N times more than the approximated value. Such behavior cannot be called a good approximation. However, even an approximation with an absolute error that is well-limited can lead to an unpredictable decrease in the accuracy of a neural network, due to a strong non-linearity between layers. For example, low-precision neural networks do not show high accuracy after direct conversion, but give perfect results with the help of special training approaches, such as those described in Zhou et al. (2017). Thus, the accuracy of one neuron approximation should not be a decisive criterion in the case of neural networks. It is more important whether or not the approximation results in a high quality network. Thus, the accuracy of the approximation was investigated after conversion and training of the network.

Figure 2:
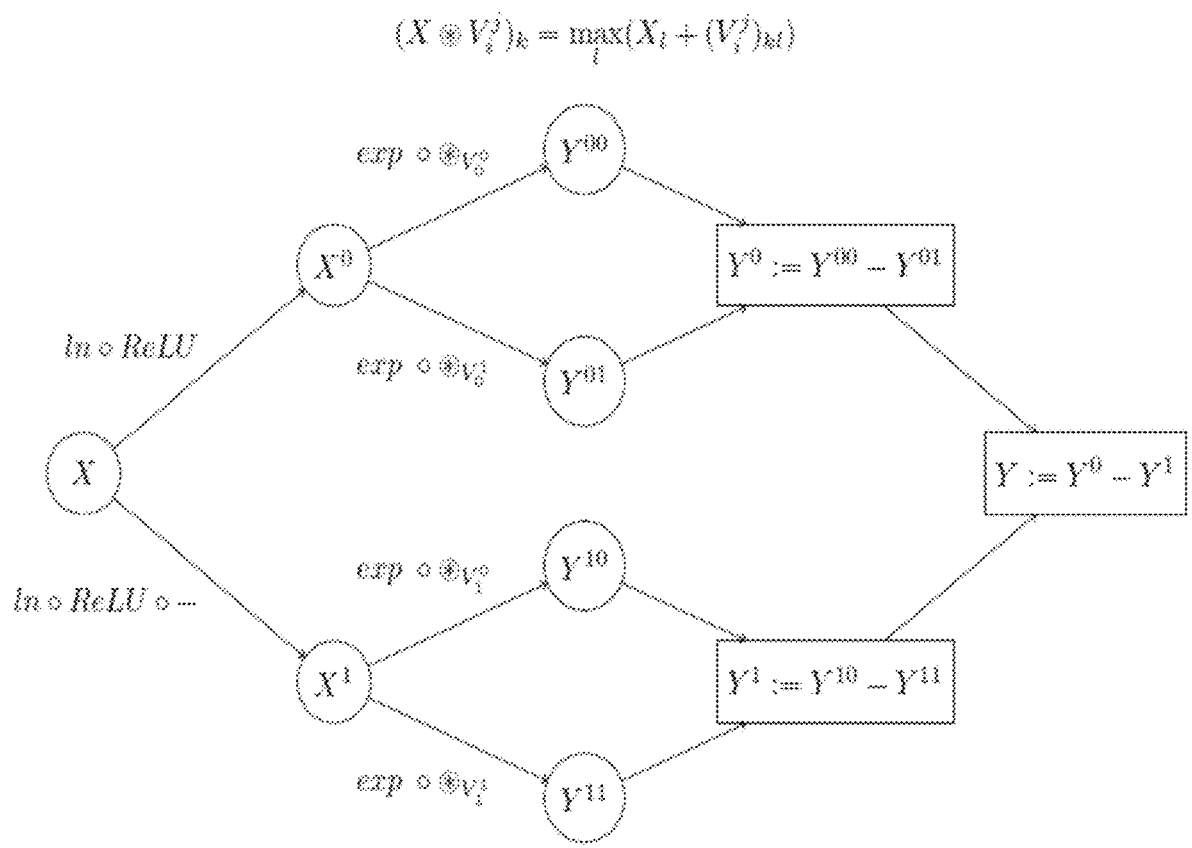
FIG. 2 illustrates a structure of a bipolar morphological layer, according to an embodiment.

FIG. 2 illustrates the structure of a BM layer, resulting from the approximation, according to an embodiment. In the illustrated embodiment, the BM layer has an input vector X and a weight matrix $V_i^j$. The symbol "∘" designates function composition. The Rectified Linear Unit (ReLU) enables the BM layer to take values above zero and create four computational paths for positive and negative inputs or coefficients. The essential morphological operation of the BM layer is then performed on the logarithm of the rectified input vector X. The results are passed to the exponential unit and subtracted to produce an output Y.

The BM layer will obtain results similar to the original or classical layer in the case of a good logarithm approximation. This occurs when the sum has one major term. If there are several dominant terms, the approximation can take this into account.

The operations of the natural logarithm (ln) and exponential unit (exp) are performed on the activation (i.e., the signal transmitted between network layers) and can be considered part of an activation function. Normally, activation functions do not make significant contributions to the computational complexity of a neural network. Thus, the increase in computational complexity should be of little consequence. If the activation function does take noticeable time, it can be approximated by a simpler function. An example of a simpler function that may be used is a piece-wise linear approximation. Another option is to perform input quantization and use look-up tables, which is also fast.

The structure of the BM layer can be expressed as follows:

$$BMN(x, w) = \exp\max_j(\ln ReLU(x_j) + v_j^0) - \exp\max_j(\ln ReLU(x_j) + v_j^1) - \exp\max_j(\ln ReLU(-x_j) + v_j^0) + \exp\max_j(\ln ReLU(-x_j) + v_j^1)$$

wherein $$v_j^m = \begin{cases} \ln|w_j|, & \text{if } (-1)^m w_j > 0 \\ -\infty, & \text{otherwise} \end{cases}$$

If a layer of the neural network includes bias, which is added to the linear combination, the bias can be added after the BM layer approximation.

2.3. Training

A method for training a neural network with BM layers will now be described. Training BM layers using standard algorithms can be challenging, since there is only one non-zero gradient element, due to the maximum operation, and only one weight is updated at each iteration. Some weights can never be updated and never fire after training, thereby giving redundancy to the network.

In an embodiment, the BM layers are trained layer by layer. In particular, convolutional and fully-connected layers are modified sequentially from the first to the last, the modified structure and weights are frozen, and then the other layers are trained. This approach enables the network to be fine-tuned and adapt to changes, while ignoring possible issues with training BMNs directly and preserving calculation accuracy. Good results have been obtained by this layer-by-layer approach during training of 8-bit integer neural networks. See, e.g., Ilin et al. The idea is to divide weights into groups, and perform approximation and fine-tuning until the approximation of the full network is introduced, as described in Zhou et al. (2017) for lossless low-bit quantization.

An embodiment of the method (Method 1) for training a neural network with BM layers may be summarized by the following algorithm:

Algorithm for Training a BM Network

Figure 3:
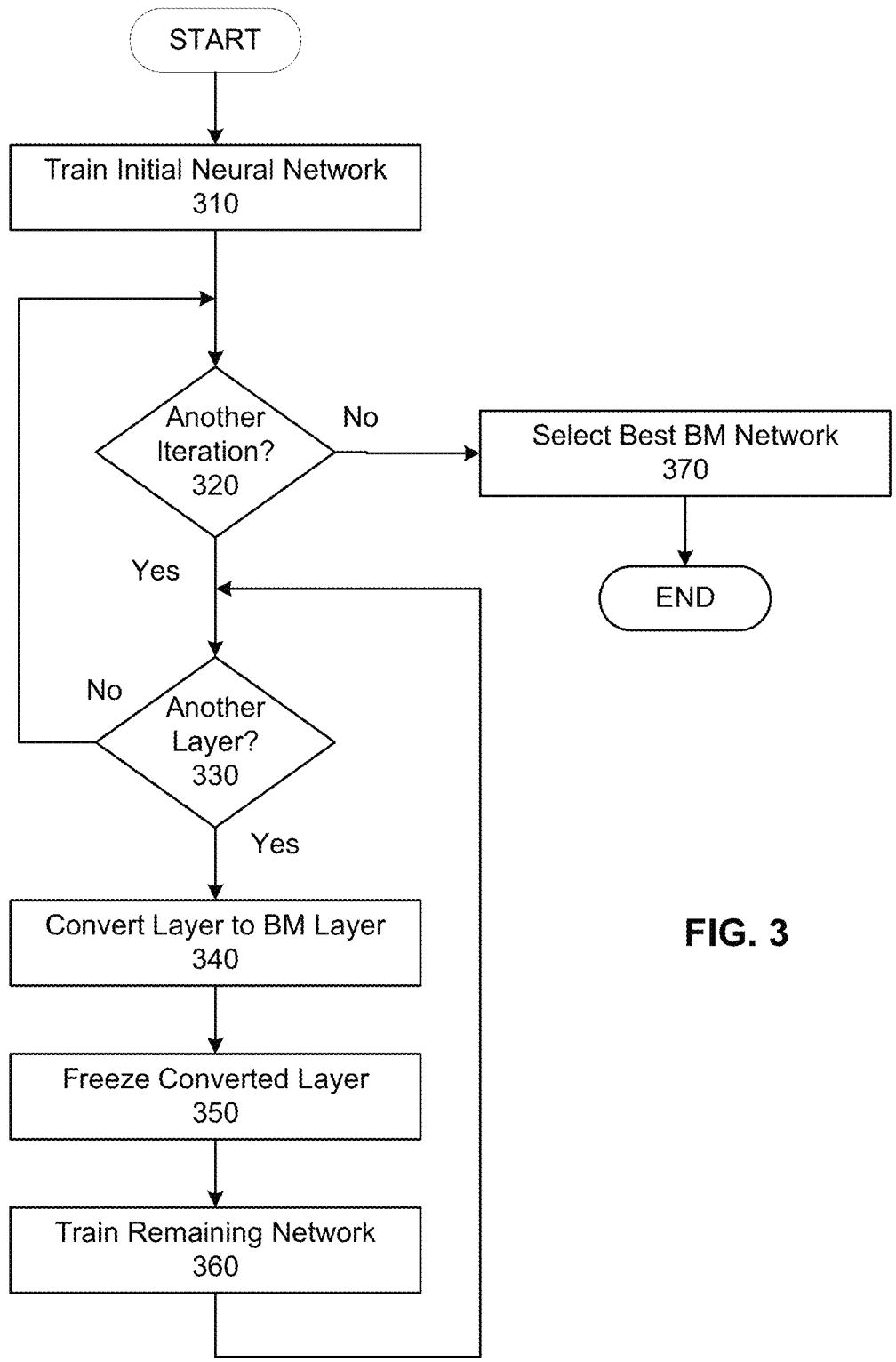
FIG. 3 illustrates a process for generating a trained bipolar morphological network, according to an embodiment.

FIG. 3 illustrates a process for generating a trained BM network, according to an embodiment of Method 1. In subprocess 310, the initial neural network is trained. Then, the process loops through one or more iterations of generating the BM network to identify a best BM network (e.g., the BM network having the highest accuracy) to be used. Specifically, in subprocess 320, the process determines whether or not another iteration is to be performed. This determination may be based on a user setting (e.g., specifying the number of iterations to be performed), a system setting (e.g., specifying a threshold accuracy that must be achieved), a combination of user and system settings (e.g., specifying the number of BM networks that must be produced with a threshold accuracy), and/or any other criteria. When determining that another iteration is to be performed (i.e., "Yes" in subprocess 320), the process loops through subprocesses 330-360. Otherwise, when determining that no more iterations are to be performed (i.e., "No" in subprocess 320), the process proceeds to step 370.

In each iteration of the loop formed by subprocesses 330-360, the initial neural network is converted into a BM network and trained. Specifically, in subprocess 330, the process determines whether or not another layer needs to be converted. All or only a subset of layers of the initial neural network may be converted to BM layers, depending on the implementation. For example, in one embodiment, only a subset of convolutional layers are converted to BM layers. In an alternative embodiment, all convolutional layers, but no other layers, are converted to BM layers. In yet another embodiment, all convolutional and fully-connected layers are converted to BM layers. When determining that another layer is to be converted (i.e., "Yes" in subprocess 330), the process proceeds to subprocess 340. Otherwise, when determining that no more layers are to be converted (i.e., "No" in subprocess 330), the process returns to subprocess 320 to determine whether or not another iteration should be performed.

In subprocess 340, the current layer is converted to a BM layer, as described elsewhere herein. For example, multiplication operations may be approximated using maximum and/or addition/subtraction operations that do not utilize multiplication. Then, in subprocess 350, the structure and weights of the converted BM layer are frozen, such that they do not change in further subprocesses within the loop performed underneath subprocess 320. In other words, as additional layers are converted and the remainder of the network is trained, the structure and weights of the converted BM layers remain fixed and do not change. Next, in subprocess 360, the remainder of the BM network is trained, for example, according to any standard training method.

In subprocess 370, once all iterations of creating a BM network have been completed, the best BM network is selected from among the BM networks that were created. The BM network may be selected based on any one or more criteria. For example, each BM network may be tested using a testing dataset, and the BM network with the highest

---

Input: Training data
Output: Neural network with BM layers
1  train classical neural network by standard methods;
2  for each convolutional and fully-connected layer do
3    approximate current layer and freeze the current layer's weights;
4    train the remaining part of the network by standard methods;
5  perform steps 1-4 several times with different initial conditions and choose the best result;

accuracy may be selected. The selected BM network may then be moved into production and executed or operated to perform one or more iterations of its task on one or a plurality of devices. For example, the BM network may be installed on an edge computing device (e.g., mobile device, such as a smartphone) to perform its task (e.g., object recognition, text recognition, binarization, etc.) in a more efficient manner than a classical neural network.

An alternative method (Method 2) for training a neural network with BM layers differs in steps 3 and 4. In particular, the weights are not frozen in step 3 (e.g., subprocess 350), and the BM layers are trained with the whole network. This method may face convergence issues and a slower training process. However, to avoid these issues, the layers may be initialized with converted weight values that are supposed to be close to the desired values.

In an embodiment, the training may comprise neuron-by-neuron fine-tuning. In addition, the approximation and freezing of weights can be performed one neuron at a time in each layer.

3. EXAMPLE EMBODIMENT

One particular embodiment of a bipolar morphological network will now be described. In this embodiment, a U-Net architecture is used, and the bipolar morphological U-Net was trained for document binarization. However, it should be understood that the techniques described with respect to this embodiment may be applied to network architectures other than a U-Net, and for tasks other than document binarization.

This embodiment addresses the semantic segmentation problem, and demonstrates that BM networks are able to handle this problem in the context of binarization. Binarization is a common procedure in image processing and computer vision. The task is to classify image pixels into two classes (e.g., foreground and background).

Figure 4:
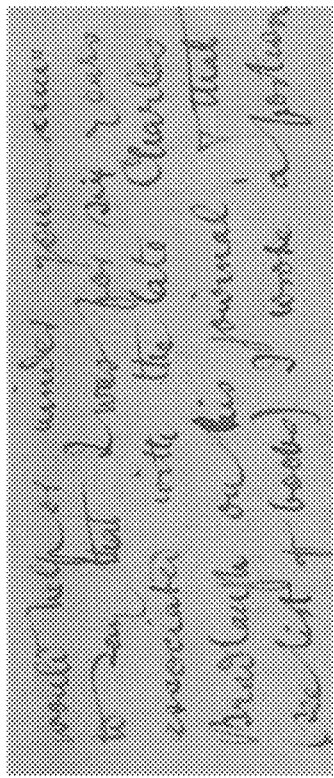
FIG. 4 illustrates examples of images and ground truth, used in a particular test.
Figure 4:
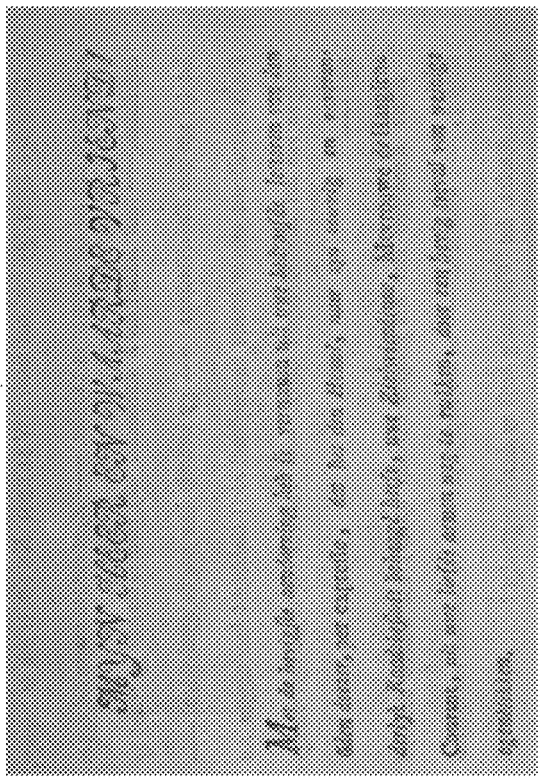

A document binarization problem is described in the Document Image Binarization Competition (DIBCO), as described in Pratikakis et al., "ICDAR2017 competition on document image binarization (DIBCO 2017)," in 2017 14th IAPR Int'l Conference on Document Analysis and Recognition (ICDAR), 01, 1395-1403 (2017), which is hereby incorporated herein by reference as if set forth in full. DIBCO is a public challenge on the binarization of historical documents. In 2017, the DIBCO challenge consisted of eighty-six training and twenty testing images, with ideal binary markup, and evaluation tools. Some samples of the input images and ground truth are illustrated in FIG. 4, in which images a) and b) represent the document image and binarized ground truth for a handwritten document, respectively, and c) and d) represent the document image and binarized ground truth for a printed document, respectively. A disclosed embodiment solves the document binarization problem based on a convolutional neural network with a U-Net architecture, which has demonstrated efficiency in various segmentation problems. See, e.g., Ronneberger et al., "U-net: Convolutional networks for biomedical image segmentation," in Int'l Conference on Medical Image Computing and Computer-Assisted Intervention, 234-241, Springer (2015); Baheti et al., "Eff-Unet: A novel architecture for semantic segmentation in unstructured environment," in Proceedings of the IEEE/CVF Conference on Computer Vision and Pattern Recognition (CVPR) Workshops (June 2020); Piantadosi et al., "Breast Segmentation in MII via U-Net Deep Convolutional Neural Networks," in 2018 24th Int'l Conference on Pattern Recognition (ICPR), 3917-3922 (2018); and Ibtehaz et al., "Multiresunet: Rethinking the U-Net architecture for multimodal biomedical image segmentation," Neural Networks 121, 74-87 (2020); which are all hereby incorporated herein by reference as if set forth in full.

The winners of the 2017 DIBCO challenge presented a solution based on a deep convolutional neural network with a U-Net architecture. See Bezmaternykh et al., "U-net-bin: hacking the document image binarization contest," Computer optics 43(5), 825-832 (2019), doi:10.18287/2412-6179-2019-43-5-825-832, which is hereby incorporated herein by reference as if set forth in full. That solution converted the images to grayscale and extracted patches that were 128×128 pixels in size. The data was then divided, with 80% in the training dataset and 20% in the validation dataset, so that all patches from one image were in the same dataset. In addition, data augmentation was performed, including adding shifts, reducing noise, improving contrast, performing scaling, and augmenting lines. The network was trained with an Adaptive Moment Estimation (ADAM) optimizer, using binary cross-entropy as a loss function and mean Intersection over Union (mIoU) to estimate binarization accuracy. The same U-Net architecture, training data, and data augmentation may be used for the disclosed embodiment.

3.1. Overview

In an embodiment, a BM neuron is an approximation of a classical or standard neuron that does not utilize multiplication, in order to enhance inference efficiency. A BM neuron is created by considering the logarithms of the input and weights, and approximating the resulting sum by its maximum term. In this case, all complex computations are performed on the activation vector for a linear number of operations, and there are no multiplication operations inside the layer. The gate complexity and latency of such a neuron are superior for sufficiently large convolutional layers.

3.2. BM Neuron Model

A classical neuron y takes a scalar product of its inputs x and weights w, adds bias $w_b$, and applies a nonlinear activation function $\sigma(\cdot)$ to the result:

$$y(x, w, w_b) = \sigma\left(\sum_{i=1}^{N} w_i x_i + w_b\right)$$

wherein N is the length of input x.

BM neuron $y_{BM}$, with inputs x, weights $v^+$ and $v^-$, bias $v_b$, and non-linear activation function $\sigma(\cdot)$, performs the following operation:

$$y_{BM}(x, v^+, v^-, v_b) = \sigma\bigl(\exp\max_{j=1}^{N}\bigl(\ln x_j^+ + v_j^+\bigr) - \exp\max_{j=1}^{N}\bigl(\ln x_j^+ + v_j^-\bigr) -$$
$$\exp\max_{j=1}^{N}\bigl(\ln x_j^- + v_j^+\bigr) + \exp\max_{j=1}^{N}\bigl(\ln x_j^- + v_j^-\bigr) + v_b\bigr)$$

wherein $$x_j^+ = \begin{cases} x_j, & x_j \geq 0 \\ 0, & x_j < 0 \end{cases}$$

$$x_j^- = \begin{cases} -x_j, & x_j < 0 \\ 0, & x_j \geq \end{cases}$$

wherein N is the length of input x, and ln 0=−∞ and is represented by a big enough negative value for real computations.

Notably, the BM neuron processes positive and negative parts of input x separately, but in the same manner. This can be interpreted as two identical computational paths, which simulate excitation and inhibition of the BM neuron, respectively.

3.3. BM Layer

BM neurons can be used to form layers in the neural network just like classical layers. In other words, for each layer with weights, a morphological analogue can be constructed. For example, the classical convolutional layer with input $I_{L \times M \times C}$ and output $J_{L \times M \times F}$ performs the following operation:

$$J = \sigma\left(\sum_{c=1}^{C}\sum_{\Delta l=0}^{K-1}\sum_{\Delta m=0}^{K-1} I(l+\Delta l, m+\Delta m, c) \cdot w(\Delta l, \Delta m, c, f) + b(f)\right)$$

wherein $f = \overline{1, F}$ $l = \overline{1, L}$ $m = \overline{1, M}$ wherein F is the number of filters, C is the number of input channels, K×K is the spatial dimensions of the filter, L×M×C is the size of the input image, w is a set of convolutional filters, and b is the bias. It is assumed that input I is adequately padded for the result to be of the same size.

l*w is denoted as:

$$I * w = \sigma\left(\sum_{c=1}^{C}\sum_{\Delta l=0}^{K-1}\sum_{\Delta m=0}^{K-1} I(l+\Delta l, m+\Delta m, c) \cdot w(\Delta l, \Delta m, c, f)\right)$$

wherein $f = \overline{1, F}$ $l = \overline{1, L}$ $m = \overline{1, M}$

Then, the convolutional layer can be written as:

$J = \sigma(I*w+b)$

The convolution operation for the BM layer can be denoted as:

$I \odot w = \max_{c=1}^{C} \max_{\Delta l=0}^{K-1} \max_{\Delta m=0}^{K-1} I(l+\Delta l, m+\Delta m, c) + w(\Delta l, \Delta m, c, f)$ wherein $f = \overline{1, F}$ $l = \overline{1, L}$ $m = \overline{1, M}$ A BM convolutional layer with input $I_{L \times M \times C}$ and output $O_{L \times M \times f}$ performs the following operation:

$J = \sigma(\exp(\ln|I| \odot v^+) - \exp(\ln|-I| \odot v^+) - \exp(\ln|I| \odot v^-) + \exp(\ln|-I| \odot v^-) + b)$ The classical fully-connected layer with input $I_p$ and output $J_Q$ performs the following operation:

$$J = \sigma\left(\sum_{p=1}^{P} I(p) \cdot w(p, q) + b(q)\right)$$

wherein $q = \overline{1, Q}$ wherein P is the number of inputs I, Q is the number of neurons in the layer, w is a set of fully-connected weights, and b is a set of biases.

A BM fully-connected layer performs the following operation:

$J = \sigma(\exp\max_{p=1}^{P}(\ln|I(p)| + v^+(p, q)) - \exp\max_{p=1}^{P}(\ln|-I(p)| + v^+(p, q)) - \exp\max_{p=1}^{P}(\ln|I(p)| + v^-(p, q)) + \exp\max_{p=1}^{P}(\ln|-I(p)| + v^-(p, q)) + b(q))$ wherein $q = \overline{1, Q}$ More complex layers in the network, such as locally-connected layers, may be converted in a similar manner. Layers without weights, such as pooling layers, merging layers, activation layers, and the like, may be included in the BM network without changes.

3.4. Training

In this embodiment, an incremental layer-by-layer training method is used, as described in Limonova et al., "Convolutional neural network structure transformations for complexity reduction and speed improvement," Pattern Recognition and Image Analysis 28(1), 24-33 (2018), doi: 10.1134/S105466181801011X, which is hereby incorporated herein by reference as if set forth in full. This training method can be summarized as follows:

(1) Train a classical neural network using a conventional method based on gradient descent;
(2) For each convolutional layer, replace the convolutional layer, having weights {w, b}, by a BM layer with weights {$v^+$, $v^-$, b}, wherein:

$v_j^+ = \begin{cases} \ln w_j, & \text{if } w_j > 0 \\ -\infty, & \text{otherwise} \end{cases}$ $v_j^- = \begin{cases} \ln |w_j|, & \text{if } w_j > 0 \\ -\infty, & \text{otherwise} \end{cases}$ (3) Perform additional training of the neural network, after the conversion of each convolutional layer in (2), using the same method as in (1).

4. EXPERIMENTAL RESULTS

Experimental results of particular implementations of a BM neural network, according to embodiments, will now be discussed.

4.1. MNIST

Figure 5:
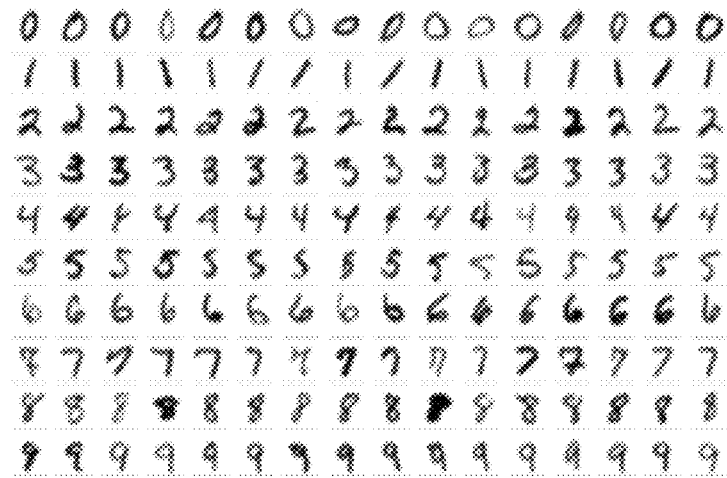
FIGS. 5 and 6 illustrate examples of images in respective training datasets, used in particular tests.
Figure 6:

MNIST is a database with images of handwritten digits, and represents a basic dataset for image classification problems. The training dataset comprises 60,000 gray images, each with 28×28 pixels. The testing dataset comprises another 10,000 images. In a particular experiment, 90% of the training dataset was used for training, and the remaining 10% of the training dataset was used for validation. FIG. 5 illustrates some example images from MNIST.

For the experiment, the convolutional and fully-connected layers of two simple convolutional neural networks (CNNs) were replaced with BM layers. The notation used to represent the architectures is as follows:

conv(n, $w_x$, $w_y$): convolutional layer with n filters of size $w_x \times w_y$.
fc(n): fully-connected layer with n neurons.
maxpool($w_x$,$w_y$): max-pooling layer with window size $w_x \times w_y$.
dropout(p): drop out the input signals with the probability p.
relu: rectifier activation function ReLU(x)=max(x, 0).
softmax: standard softmax activation function.

The $CNN_1$ architecture was:

$conv_1(30,5,5)-relu_1-dropout_1(0,2)-fc_1(10)-softmax_1$

The $CNN_2$ architecture was:

$conv_1(40,5,5)-relu_1-maxpool_1(2,2)-conv_2(40,5,5)-relu_2-fc_1(200)-relu_3-dropout_1(0,3)-fc_2(10)-softmax_1$ Layer-by-layer conversion to the BM network was performed on $CNN_1$ and $CNN_2$. The table below depicts the resulting accuracy for each converted part:

|  |  | Accuracy (%) | | | |
|---|---|---|---|---|---|
|  |  | Method 1 | | Method 2 | |
| CNN | Converted Part | before fine-tuning | after fine-tuning | before fine-tuning | after fine-tuning |
| $CNN_1$ | none | 98.72 | — | 98.72 | — |
|  | $conv_1$ | 42.47 | 98.51 | 38.38 | 98.76 |
|  | $conv_1$-$relu_1$-$dropout_1$-$fc_1$ | 26.89 | — | 19.86 | 94.00 |
| $CNN_2$ | none | 99.45 | — | 99.45 | — |
|  | $conv_1$ | 94.90 | 99.41 | 94.57 | 99.42 |
|  | $conv_1$-$relu_1$-$maxpool_1$-$conv_2$ | 21.25 | 98.68 | 36.23 | 99.37 |
|  | $conv_1$-$relu_1$-$maxpool_1$-$conv_2$-$relu_2$-$fc_1$ | 10.01 | 74.95 | 17.25 | 99.04 |
|  | $conv_1$-$relu_1$-$maxpool_1$-$conv_2$-$relu_2$-$fc_1$-$dropout_1$-$relu_3$-$fc_2$ | 12.91 | — | 48.73 | 97.86 |

The converted part of "none" corresponds to the original classical network, which may be referred to herein as an "initial" neural network. The table above demonstrates the accuracies for Methods 1 and 2 both before fine-tuning (i.e., when the BM layer's weights are not trained) and after fine-tuning (i.e., the whole network is trained). All values were averaged over ten measurements with random initialization.

The results of the training without BM layers showed a moderate decrease in accuracy for convolutional layers and a dramatic decrease in accuracy for fully-connected layers. This can happen due to the drop in approximation quality for these layers. Furthermore, the accuracy with two converted convolutional layers is not much better than the accuracy of the fully-connected layers only. This means that BM convolutions without training perform only slightly better than random. However, results with training of converted layers show almost no accuracy decrease after the conversion of the convolutional layers and better results for fully-connected layers.

The experimental results do not necessarily mean that BM neural networks with fully-connected layers cannot reach the accuracy of classical networks. Training methods for BM neurons are still being investigated. In the experiment, conversion works excellently for convolutional layers, but gives poor results for fully-connected layers. At the same time, neural network inference consumes major time for convolutional layers. Thus, the disclosed BM network speeds up neural network inferences. With additional training techniques, the quality of the multiplication-free BM network may achieve state-of-the art.

4.2. MRZ

For MRZ experimentation, a private dataset of about $2.8 \times 10^5$ gray images, each 21×17 pixels in size, was used. The images contained thirty-seven MRZ symbols, which were extracted from real documents with machine-readable zones. 90% of the dataset was used for training, the remaining 10% of the dataset was used for validation, and $9.4 \times 10^4$ additional images were used for testing. Again, two CNNs were used.

The $CNN_3$ architecture was:

$conv_1(8,3,3)-relu_1-conv_2(30,5,5)-relu_2-conv_3(30,5,5)-relu_3-dropout_1(0,25)-fc_1(37)-softmax_1$ The $CNN_4$ architecture was:

$conv_1(8,3,3)-relu_1-conv_2(8,5,5)-relu_2-conv_3(8,3,3)-relu_3-dropout_1(0,25)-conv_4(12,5,5)-relu_4-conv_5(12,3,3)-relu_5-conv_6(12,1,1)-relu_6-fc_1(37)-softmax_1$ The table below depicts the resulting accuracy for each converted part:

|  |  | Accuracy (%) | | | |
|---|---|---|---|---|---|
|  |  | Method 1 | | Method 2 | |
| CNN | Converted Part | before fine-tuning | after fine-tuning | before fine-tuning | after fine-tuning |
| $CNN_3$ | none | 99.63 | — | 99.63 | — |
|  | $conv_1$ | 97.76 | 99.64 | 83.07 | 99.62 |
|  | $conv_1$-$relu_1$-$conv_2$ | 8.59 | 99.47 | 21.12 | 99.58 |
|  | $conv_1$-$relu_1$-$conv_2$-$relu_2$-$conv_3$ | 3.67 | 98.79 | 36.89 | 99.57 |
|  | $conv_1$-$relu_1$-$conv_2$-$relu_2$-$conv_3$-$relu_3$-$dropout_1$-$fc_1$ | 12.58 | — | 27.84 | 93.38 |
| $CNN_4$ | none | 99.67 | — | 99.67 | — |
|  | $conv_1$ | 91.20 | 99.66 | 93.71 | 99.67 |
|  | $conv_1$-$relu_1$-$conv_2$ | 6.14 | 99.52 | 73.79 | 99.66 |

-continued

| CNN | Converted Part | Accuracy (%) | | | |
|---|---|---|---|---|---|
| | | Method 1 | | Method 2 | |
| | | before fine-tuning | after fine-tuning | before fine-tuning | after fine-tuning |
| | $conv_1$-$relu_1$-$conv_2$-$relu_2$-$conv_3$ | 23.58 | 99.42 | 70.25 | 99.66 |
| | $conv_1$-$relu_1$-$conv_2$-$relu_2$-$convs$-$relu_3$-$dropout_1$-$conv_4$ | 29.56 | 99.04 | 77.92 | 99.63 |
| | $conv_1$-$relu_1$-$conv_2$-$relu_2$-$conv_3$-$relu_3$-$dropout_1$-$conv_4$-$relu_4$-$conv_5$ | 34.18 | 98.45 | 17.08 | 99.64 |
| | $conv_1$-$relu_1$-$conv_2$-$relu_2$-$conv_3$-$relu_3$-$dropout_1$-$conv_4$-$relu_4$-$conv_5$-$relu_5$-$conv_6$ | 5.83 | 98.00 | 90.46 | 99.61 |
| | $conv_1$-$relu_1$-$conv_2$-$relu_2$-$conv_3$-$relu_3$-$dropout_1$-$conv_4$-$relu_4$-$conv_5$-$relu_5$-$conv_6$-$relu_6$-$fc_1$ | 4.70 | — | 27.57 | 95.46 |

The converted part of "none" corresponds to the original classical network. The table above demonstrates the accuracies for Methods 1 and 2 both before fine-tuning (i.e., when the BM layer's weights are not trained) and after fine-tuning (i.e., the whole network is trained). All values were averaged over ten measurements with random initialization.

The recognition accuracy of the neural network, after the first two convolutional layers and the remaining part of the network have been trained (with frozen BM layers), is only slightly different from the original classical network, but then decreases significantly after that. A possible reason for this may be the difficulty in adapting to new approximate features extracted by the BM convolutional layers. However, training of the full converted network, including BM layers, shows no significant decrease in accuracy for all convolutional layers, but does show a visible decrease in accuracy for fully-connected layers. Thus, in an embodiment, only convolutional layers of the neural network are converted and trained, in order to keep the original recognition quality.

4.3. Binarization

Figure 7:
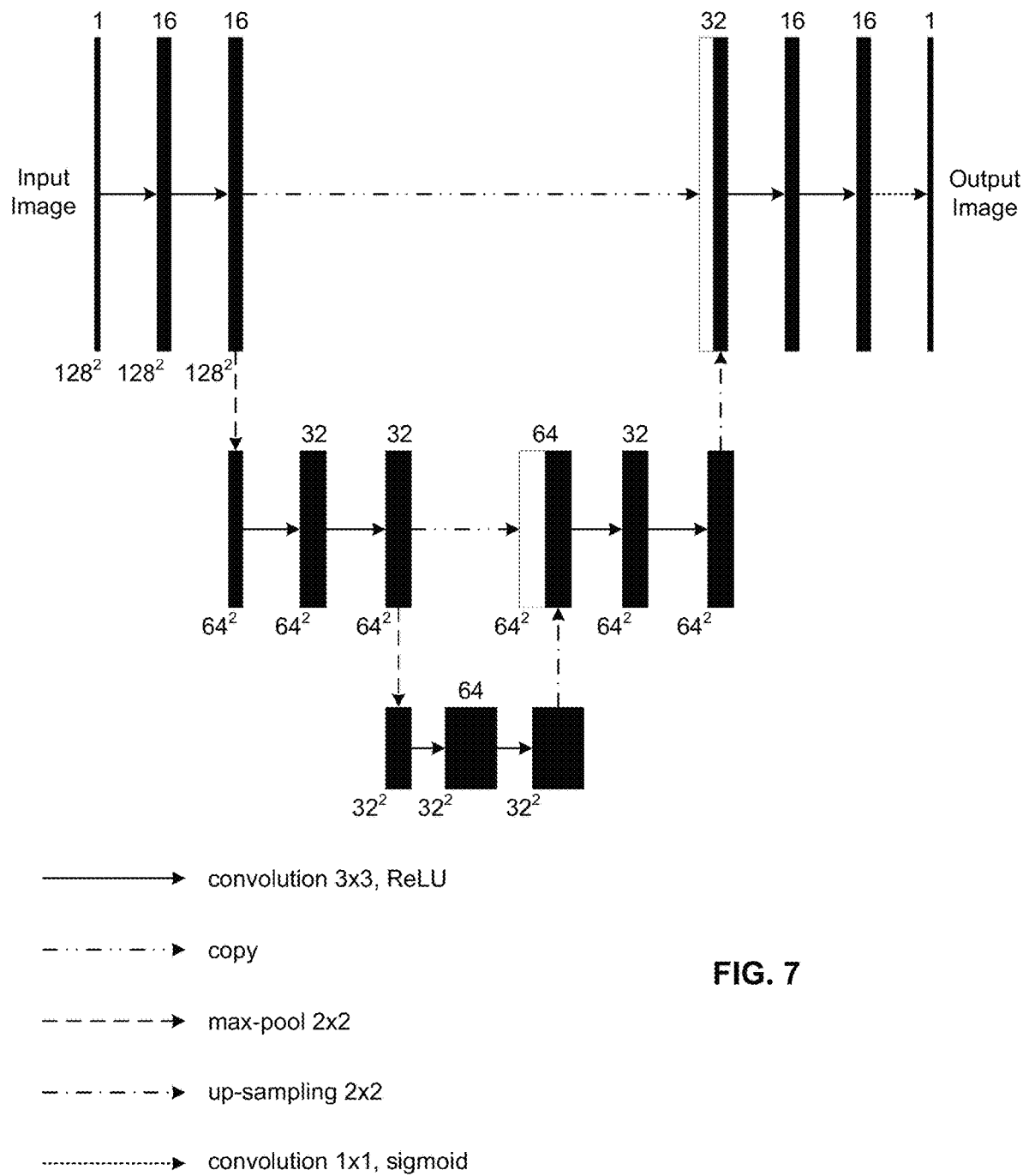
FIG. 7 illustrates the architecture of a U-net, according to an embodiment.

As described elsewhere herein, for the document binarization task, a convolutional neural network having a U-Net architecture was used as a baseline. FIG. 7 illustrates the network architecture, according to an embodiment. As illustrated, the architecture comprises ten convolutional layers with a kernel size of 3×3 and ReLU activation, and a final convolutional layer with a kernel size of 1×1 and sigmoid activation. To obtain binary output, output values are rounded. FIG. 8A illustrates an input image of a handwritten document, the binarization of the classical U-Net, and an ideal binarization, respectively. FIG. 8B illustrates the binarization of the same image, as performed by the BM U-Net, according to an embodiment.

In the particular embodiment described herein, the conversion of convolutional layers and the additional training of convolutional layers is performed, sequentially, layer by layer. The results of the training for all conversion steps are depicted in the table below:

Accuracy of BM U-Net for Each Converted Component

| N converted layers | 0 | 1 | 2 | 3 | 4 | 5 | 6 | 7 | 8 | 9 | 10 |
|---|---|---|---|---|---|---|---|---|---|---|---|
| Validation mIoU (%) | 99.36 | 99.36 | 99.33 | 99.23 | 99.21 | 99.07 | 99.11 | 99.08 | 99.02 | 98.85 | 98.79 |

These results demonstrate that there were no accuracy loss in two BM layers, a small decrease in seven BM layers, and an error increase for the whole converted network of 1.9 times. Overall, this represents high performance for the network. The table below depicts the full evaluation of the BM network in terms of the metrics presented in Pratikakis et al.:

Evaluation Results

| Method | FM | Fps | PSNR | DRD |
|---|---|---|---|---|
| Otsu (Bezmaternykh et al.) | 77.73 | 77.89 | 13.85 | 15.50 |
| Sauvola (Bezmaternykh et al.) | 77.11 | 84.10 | 14.25 | 8.85 |
| U-Net (Bezmaternykh et al.) | 91.01 | 92.86 | 18.28 | 3.40 |
| U-Net (baseline) | 90.89 | 92.77 | 18.15 | 3.31 |
| BM U-Net (10 layers) | 85.82 | 88.02 | 17.00 | 5.13 |
| BM U-Net (9 layers) | 87.72 | 89.50 | 17.09 | 4.87 |
| BM U-Net (8 layers) | 87.24 | 89.41 | 17.25 | 4.68 |
| BM U-Net (7 layers) | 88.97 | 90.59 | 17.49 | 4.19 |
| BM U-Net (6 layers) | 88.21 | 90.21 | 17.41 | 4.50 |
| BM U-Net (5 layers) | 89.29 | 91.07 | 17.49 | 4.38 |
| BM U-Net (4 layers) | 90.50 | 92.07 | 17.95 | 3.59 |
| BM U-Net (3 layers) | 90.42 | 92.45 | 18.01 | 3.52 |
| BM U-Net (2 layers) | 90.35 | 92.56 | 18.00 | 3.50 |
| BM U-Net (1 layer) | 90.87 | 92.43 | 18.04 | 3.39 |

FM refers to the F-measure, which may be expressed as:

$$FM = \frac{2 \times Recall \times Precision}{Recall + Precision} \text{ wherein}$$

$$Recall = TP + FN$$

$$Precision = TP + FP$$

wherein TP is a number of true positives, FP is a number of false positives, and FN is a number of false negatives.

Fps refers to the pseudo-F-measure. Fps uses pseudo-Recall (Rps) and pseudo-Precision (Pps), which are calculated with the same formula as in F-measure. However, Rps and Pps use distance weights with respect to the ground truth image.

PSNR refers to the peak signal-to-noise ratio, which may be expressed as:

$$PSNR = 10 \log \frac{C^2}{MSE} \text{ wherein}$$

$$MSE = \frac{\sum_{k=1}^{M} \sum_{y=1}^{N} (I(x, y) - I'(x, y))^2}{MN}$$

wherein C is the difference between foreground and background. PSNR represents the similarity of images I and I'. The higher the value of PSNR, the more closely the images I and I' correspond to each other.

DRD refers to the distance-reciprocal-distortion metric. DRD is used to measure the visual distortion in binarized document images. See, e.g., Haiping et al., "Distance-reciprocal distortion measure for binary document images," Signal Processing Letters 11(2), 228-231 (2004), which is hereby incorporated herein by reference as if set forth in full. DRD correlates with the human visual perception and is aimed to measure the distortion for all the flipped pixels (i.e., from black to white or from white to black) as follows:

$$DRD = \frac{\sum_{k=1}^{S} DRD_k}{NUBN}$$

wherein S is the number of flipped pixels, NUBN is the number of non-uniform (i.e., not all black or white pixels) 8×8 blocks in the ground truth image GT, and $DRD_k$ is the distortion of the k-th flipped pixel. DRD is calculated using a 5×5 normalized weight matrix $W_{Nm}$, as defined in Haiping et al. $DRD_k$ is equal to the weighted sum of the pixels in the 5×5 block of the ground truth image that differs from the centered k-th flipped pixel at (x,y) in the binarized image B:

$$DRD_k = \sum_{i=-2}^{2} \sum_{j=-2}^{2} |GT_k(i, j) - B_k(x, y)| W_{Nm}(i, j)$$

Notably, the disclosed BM network performed worse than the baseline U-Net, but significantly outperformed the Otsu and Sauvola baseline methods. Overall, the accuracy was acceptable, providing the potential for fast, lightweight, recognition models for end devices. In addition, FPGA implementations of BM layers with typical parameters require about two times fewer gates and have 15-30% lower latency than classical convolutional layers, thereby making it possible to create high-speed and efficient processing units for semantic segmentation. Moreover, the binarization quality of the network decreased relatively smoothly with the conversion of the convolutional layers to BM layers. This means that the creator of a BM network can flexibly choose the desired balance between quality and network complexity.

5. OVERVIEW OF EXEMPLARY EMBODIMENTS

In an embodiment, a new bipolar morphological neuron, which approximates a classical neuron, is used in a neural network. Inside the neuron, the maximum is taken from the shifted input signals, and the activation function includes additional non-linearity.

One or more layers of a classical neural network are converted to BM layer(s), using this new bipolar morphological neuron. Within a BM layer, positive and negative parts of the input signal and filters are separated and processed by different pathways. The layer(s) may be converted into BM layer(s) layer by layer, and the remaining part of the full neural network may be trained using standard methods. Advantageously, this approach avoids training issues, such as updating only one weight at each step due to maximum operations. Experiments demonstrate that the recognition accuracy of BM networks, which have only their convolutional layers converted, is close to the accuracy of the original classical networks for various tasks.

Advantageously, BM neural networks can improve the speed of neural network inference, because, for most modern devices, addition/subtraction and maximum/minimum operations have lower latency than multiplication operations. Since the BM neuron does not use multiplication, it can provide an advantage in inference speed for specialized FPGA and ASIC systems. In other words, these FPGA and ASIC systems for BM neural networks can be easier and more energy efficient, because they do not require multiplication units for convolutions. While complex activation functions may be used, these activation functions take much less time than convolutional or fully-connected layers, because they are applied to the activation signal between layers and have only linear complexity. Furthermore, activation functions can be approximate and implemented via look-up tables and be computed even faster. Notably, state-of-the-art methods for speeding up neural network inference, such as low-precision computations, pruning, and structure simplifications, can also be applied to the disclosed BM model.

Advantageously, the disclosed BM structure enables BM layers to be included in existing architectures and do not restrict these architectures in any manner. For example, morphological neural networks do not allow many layers to be stacked to increase quality. However, with the disclosed structure, the number of BM layers can vary without training concerns.

The disclosed BM neural network provides recognition accuracy close to that of classical neural networks, especially if converting only computationally complex parts, but improves inference speed. The disclosed training method can be developed, for example, to allow training from scratch and improve results for BM fully-connected layers.

In summary, a bipolar morphological neuron model and a bipolar morphological layer model are disclosed. The models use only operations of addition, subtraction, maximum, and/or minimum inside the neuron, and exponent and logarithm as activation functions for the layer. Unlike existing morphological neural networks, the models approximate the classical computations and produce better recognition results.

A layer-by-layer approach to training the bipolar morphological neural networks is also disclosed. In a further embodiment, an incremental approach for separate neurons could be used to produce even higher accuracy. Neither of these approaches require special training algorithms. Rather, both of these approaches can use a variety of gradient descent training algorithms.

To demonstrate the efficiency of the disclosed model, a classical convolutional neural network was used. The convolutional layers of the classical convolutional neural network were converted and pre-trained into bipolar morphological layers. Experiments on MNIST and MRZ recognition and document binarization demonstrated only moderate decreases in accuracy after the conversion and training. The faster inference speeds provided by the bipolar morphological model may be very useful in mobile and embedded systems.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   convert an initial neural network into a bipolar morphological neural network by, for one or more convolutional layers in the initial neural network, converting the convolutional layer into a bipolar morphological layer by replacing each calculation of $$\sum_{i=1}^{N} x_i w_i$$

wherein x is an input in an input vector that has a length N, and w is a weight, with a calculation of $$\exp \max_j (y_j + v_j)$$

wherein exp is an exponential function, max identifies a maximum, y is a new input derived from x, and v is a new weight derived from w; and train each bipolar morphological layer in the bipolar morphological neural network layer by layer,
   wherein each bipolar morphological layer processes positive and negative parts of x separately but in a same manner, and
   wherein a structure of the bipolar morphological layer is:

$$\exp \max_j \left(\ln ReLU(x_j) + v_j^0\right) - \exp \max_j \left(\ln ReLU(x_j) + v_j^1\right) -$$
   $$\exp \max_j \left(\ln ReLU(-x_j) + v_j^0\right) + \exp \max_j \left(\ln ReLU(-x_j) + v_j^1\right) \text{ wherein}$$

$$v_j^k = \begin{cases} \ln |w_j|, & \text{if } (-1)^k w_j > 0 \\ -\infty, & \text{otherwise} \end{cases}$$

wherein ln is a natural logarithm.

2. The method of claim 1, wherein training the bipolar morphological neural network comprises, sequentially from first to last, for each bipolar morphological layer:
   training the bipolar morphological layer; and,
   after training the bipolar morphological layer and before any subsequent training, freezing a structure and weights of the bipolar morphological layer, such that the structure and weights of the bipolar morphological layer do not change during the subsequent training.

3. The method of claim 1, wherein the initial neural network has a U-Net architecture.

4. The method of claim 1, further comprising using the at least one hardware processor to execute the trained bipolar morphological neural network to complete a task that produces an output from an input.

5. The method of claim 4, wherein the input comprises an image, and wherein the task comprises object recognition within the image.

6. The method of claim 4, wherein the input comprises an image, and wherein the task comprises text recognition within the image.

7. The method of claim 4, wherein the input comprises an image, wherein the task comprises classifying each pixel in the image into one of two classes, and wherein the output comprises a binarization of the image.

8. The method of claim 7, wherein the initial neural network has a U-Net architecture.

9. The method of claim 7, wherein the two classes consist of foreground and background.

10. The method of claim 4, further comprising using the at least one hardware processor to generate the input by:
    converting an input image to grayscale; and
    extracting a plurality of patches from the grayscale input image, wherein each of the plurality of patches is an input to the trained bipolar morphological neural network.

11. The method of claim 1, further comprising using the at least one hardware processor to, before converting the initial neural network into the bipolar morphological neural network, train the initial neural network.

12. The method of claim 1, further comprising using the at least one hardware processor to, after training each bipolar morphological layer in the bipolar morphological neural network layer by layer, training a remainder of the bipolar morphological neural network without changing a structure and weights of any bipolar morphological layers in the bipolar morphological neural network.

13. A method of comprising using at least one hardware processor to:

convert an initial neural network into a bipolar morphological neural network by, for one or more convolutional layers in the initial neural network, converting the convolutional layer into a bipolar morphological layer by replacing each calculation of $$\sum_{i=1}^{N} x_i w_i$$

wherein x is an input in an input vector that has a length N, and w is a weight, with a calculation of $$\exp \max_{j}(y_j + v_j)$$

wherein exp is an exponential function, max identifies a maximum, y is a new input derived from x, and v is a new weight derived from w, and
train each bipolar morphological layer in the bipolar morphological neural network layer by layer,
wherein converting an initial neural network into a bipolar morphological neural network further comprises, for one or more fully-connected layers in the initial neural network, converting the fully-connected layer into a bipolar morphological layer by replacing an operation of $$J = \sigma\left(\sum_{p=1}^{P} I(p) \cdot w(p, q) + b(q)\right) \text{ wherein}$$

$$q = \overline{1, Q}$$

wherein I is an input to the fully-connected layer, J is an output from the fully-connected layer, σ is a nonlinear activation function, P is a number of inputs I, Q is a number of neurons in the fully-connected layer, w(p, q) is a weight for input p and neuron q, and b(q) is a bias for neuron q,
with an operation of $$J = \sigma\big(\exp \max_{p=1}^{P}(\ln|I(p)| + v^+(p, q)) - \exp \max_{p=1}^{P}(\ln|-I(p)| + v^+(p, q)) -$$
$$\exp \max_{p=1}^{P}(\ln|I(p)| + v^-(p, q)) + \exp \max_{p=1}^{P}(\ln|-I(p)| + v^-(p, q)) + b(q)\big)$$

wherein $v^+(p, q)$ is a new weight for a positive part of input p and neuron q, and wherein $v^-(p, q)$ is a new weight for a negative part of input p and neuron q.

14. The method of claim 1, wherein all convolutional layers in the initial neural network are converted into bipolar morphological layers.

15. The method of claim 14, wherein the convolutional layers in the initial neural network are the only layers in the initial neural network that are converted into bipolar morphological layers.

16. A system comprising:
at least one hardware processor; and
one or more software modules that are configured to, when executed by the at least one hardware processor, convert an initial neural network into a bipolar morphological neural network by, for one or more convolutional layers in the initial neural network, converting the convolutional layer into a bipolar morphological layer by replacing each calculation of $$\sum_{i=1}^{N} x_i w_i$$

wherein x is an input in an input vector that has a length N, and w is a weight,
with a calculation of $$\exp \max_{j}(y_j + v_j)$$

wherein exp is an exponential function, max identifies a maximum, y is a new input derived from x, and v is a new weight derived from w, and
train each bipolar morphological layer in the bipolar morphological neural network layer by layer,
wherein each bipolar morphological layer processes positive and negative parts of x separately but in a same manner, and
wherein a structure of the bipolar morphological layer is:

$$\sigma\big(\exp \max_{j=1}^{N}(\ln x_j^+ + v_j^+) - \exp \max_{j=1}^{N}(\ln x_j^+ + v_j^-) -$$
$$\exp \max_{j=1}^{N}(\ln x_j^- + v_j^+) + \exp \max_{j=1}^{N}(\ln x_j^- + v_j^-) + v_b\big) \text{ wherein}$$

$$x_j^+ = \begin{cases} x_j, & x_j > 0 \\ 0, & x_j < 0 \end{cases}$$

$$x_j^- = \begin{cases} -x_j, & x_j < 0 \\ 0, & x_j \geq 0 \end{cases}$$

$$v_j^k = \begin{cases} \ln |w_j|, & \text{if } (-1)^k w_j > 0 \\ -\infty, & \text{otherwise} \end{cases}$$

wherein ln is a natural logarithm.

17. A non-transitory computer-readable medium having instructions stored thereon, wherein the instructions, when executed by a processor, cause the processor to:
convert an initial neural network into a bipolar morphological neural network by, for one or more convolutional layers in the initial neural network, converting the convolutional layer into a bipolar morphological layer by replacing each calculation of $$\sum_{i=1}^{N} x_i w_i$$

wherein x is an input in an input vector that has a length N, and w is a weight, with a calculation of $$\exp \max_{j}(y_j + v_j)$$

wherein exp is an exponential function, max identifies a maximum, y is a new input derived from x, and v is a new weight derived from w; and
train each bipolar morphological layer in the bipolar morphological neural network layer by layer, wherein each bipolar morphological layer processes positive and negative parts of x separately but in a same manner, and wherein a structure of the bipolar morphological layer is:

$$\sigma\bigl(\exp\,\max_{j=1}^{N}(\ln\,x_j^+ + v_j^+) - \exp\,\max_{j=1}^{N}(\ln\,x_j^+ + v_j^-) - \exp\,\max_{j=1}^{N}(\ln\,x_j^- + v_j^+) + \exp\,\max_{j=1}^{N}(\ln\,x_j^- + v_j^-) + v_b\bigr)$$

wherein $$x_j^+ = \begin{cases} x_j, & x_j \geq 0 \\ 0, & x_j < 0 \end{cases}$$

$$x_j^- = \begin{cases} -x_j, & x_j < 0 \\ 0, & x_j \geq 0 \end{cases}$$

$$v_j^k \begin{cases} \ln|w_j|, & \text{if } (-1)^k w_j > 0 \\ -\infty, & \text{otherwise} \end{cases}$$

wherein ln is a natural logarithm.

* * * * *